United States Patent [19]
Stewart et al.

[11] 3,944,653
[45] Mar. 16, 1976

[54] PROCESS FOR PREPARING HIGH PURITY ANTIMONY TRICHLORIDE AND ANTIMONY OXIDE FROM STIBNITE ORES

[75] Inventors: Robert D. Stewart, La Habra; John R. McKinley, Claremont, both of Calif.

[73] Assignee: Occidental Petroleum Corporation, Los Angeles, Calif.

[22] Filed: Oct. 9, 1973

[21] Appl. No.: 404,618

Related U.S. Application Data

[63] Continuation-in-part of Ser. No. 284,981, Aug. 30, 1972, which is a continuation-in-part of Ser. No. 182,871, Sept. 22, 1971.

[52] U.S. Cl. .................. 423/491; 423/88; 423/563; 423/568; 423/617
[51] Int. Cl.² ............................................. C01B 9/00
[58] Field of Search ............ 423/88, 491, 511, 563, 423/567, 568, 617; 75/69, 112, 113, 149

[56] References Cited
UNITED STATES PATENTS

| | | | |
|---|---|---|---|
| 412,300 | 10/1889 | Selwyn | 75/112 |
| 739,374 | 9/1903 | Baker et al. | 75/112 |
| 841,102 | 1/1907 | Baker et al. | 75/113 |
| 890,432 | 6/1908 | Masson | 75/112 |
| 1,011,899 | 12/1911 | Ashcroft | 423/88 |
| 1,980,809 | 11/1934 | Levy | 75/113 |
| 2,401,001 | 5/1946 | Jones | 75/113 |
| 2,860,047 | 11/1958 | Reynaud et al. | 423/88 |
| 3,240,557 | 3/1966 | Lerner | 75/112 |
| 3,505,011 | 4/1970 | Sirtl | 423/88 |
| 3,656,935 | 4/1972 | Iwasaki | 75/113 |
| 3,660,026 | 5/1972 | Michel et al. | 75/113 |

*Primary Examiner*—Oscar R. Vertiz
*Assistant Examiner*—Wayne A. Langel
*Attorney, Agent, or Firm*—Christie, Parker & Hale

[57] ABSTRACT

Antimony sulfide contained in an antimony sulfide bearing ore, such as stibnite, is converted to high purity antimony trichloride by reacting the antimony sulfide bearing ore with a source of chlorine to form high purity antimony trichloride and sulfur or hydrogen sulfide as separable by-products. The high purity antimony trichloride may be hydrolyzed to form high purity antimony oxide.

14 Claims, No Drawings

PROCESS FOR PREPARING HIGH PURITY ANTIMONY TRICHLORIDE AND ANTIMONY OXIDE FROM STIBNITE ORES

BACKGROUND OF THE INVENTION

This is a continuation-in-part of our application, Ser. No. 284,981 filed Aug. 30, 1972, which is in turn a continuation-in-part of our application Ser. No. 182,871 filed Sept. 22, 1971.

Antimony sulfide bearing minerals such as stibnite, are found in a variety of ores. Dressing of the ores by various means including flotation will yield a high antimony sulfide content concentrate which still contains as normal, common contaminants, arsenic, lead, zinc, silver and the like.

Of these, arsenic is a particularly notorious contaminant in that its behavior is sufficiently similar to antimony that it tends to be carried along with the antimony in conventional processes usually employed to convert stibnite to antimony metal, antimony chloride or other antimony derivatives.

In certain regions of the United States, for instance, the arsenic content of the ore can be as high as about 10 percent and such ores have not been, heretofore, processed to any extent for recovery of antimony because of the tendency of arsenic to remain as a contaminant in the product.

Several processes are generally employed for obtaining antimony or antimony derivatives from antimony sulfide bearing ores.

Some basically involve pyrometallurgical methods.

One such process involves direct oxidation in which antimony sulfide is converted to volatilized antimony oxide by the reaction:

$$2 Sb_2S_3 + 9 O_2 \rightarrow Sb_2O_3 + 3 SO_2 \qquad (1)$$

The volatilized antimony oxide is recovered in flues, condensing pipes, baghouses, precipitators and the like.

The sulfur dioxide generated is generally vented to the atmosphere as a pollutant or presents a polution control problem.

Another process involves merely heating the ore to melt the antimony sulfide which is drained from the ore as a liquid. The product is then converted to another antimony derivatives. However, sulfur dioxide is also generated as a by-product.

Stibnite has also been reacted directly with carbon or iron to form antimony metal. The antimony produced by such process is usually of low purity and volatilization losses are high.

Blast furnace melting has also been employed, but capital costs are high and there is generated sulfur dioxide.

In U.S. Pat. No. 3,432,255 to Long et al., there is provided a process for converting ores containing a variety of metals including antimony to chloride compounds by reaction with hydrogen chloride and an oxidizing gas, i.e., air or oxygen, at temperatures sufficiently high such that the desired metal values are converted to volatile chloride compounds. The process employs, in general, an excess of oxygen required for the desired reaction and where antimony is present in the ore it is normally formed as an iron free antimony oxychloride.

Although antimony may be present, the primary metal sought is molybdenum. The object, moreover, is to form desired metal chlorides free of iron, tungsten, calcium, magnesium and lead. No mention is made of processing an arsenic-bearing ore.

In British patent specification 778,705, oxides of aluminum, tin, silicon, zinc, antimony, chromium, berylium, zirconium, cobalt, nickel, boron, cadminum, lithium, and vanadium are prepared by halide hydrolysis by introducing the halide under its own vapor pressure into a cylindrical reaction zone and simultaneously injecting a mixture of hydrogen and an oxygen containing gas tangentially into the reactor to form water and hydrolyze the halide. The metal oxide reaction products may be separated from the reaction gases by cyclones and the solids-free gases scrubbed to remove any acids formed.

SUMMARY OF THE INVENTION

According to the present invention, there is provided a process for the production of high purity antimony trichloride from antimony sulfide or more particularly antimony sulfide bearing ores which includes as part of the process conservation of sulfur and elimination of sulfur pollutants.

The process of the invention, in general, comprises reacting antimony sulfide or an antimony sulfide bearing ore with a source of chlorine at a temperature sufficient to convert antimony sulfide to antimony trichloride with attendant conversion of the bound sulfur to elemental sulfur or hydrogen sulfide, then distilling the reaction mass to remove materials normally boiling below about 200°C, further distilling the reaction mass to obtain an antimony trichloride fraction at a temperature range, depending on the pressure employed, of from about 200°C to about 240°C, preferably from about 215°C to about 225°C and more preferably about 220°C for atmospheric pressure. Higher temperatures may be employed for super atmospheric pressures. Lower temperatures may be employed for sub-atmospheric pressures.

If sulfur is formed during the conversion of antimony sulfide to antimony trichloride, the sulfur remains as the principal residue.

The presently preferred route is to carry out the reaction in a gas-liquid phase, the liquid being molten antimony trichloride present as a heel or formed as a consequence of the reaction between hydrogen chloride and/or chlorine. The general range at which reaction may take place is from about 72°C to about 200°C, more preferably from about 72°C to about 120°C. Lower temperatures are preferred as oxygen can be tolerated without fear of sulfur dioxide formation.

Hydrogen chloride is the preferred reactant and preferably employed in the anhydrous or nearly water free state to avoid hydrolysis. The principal products are antimony trichloride and gaseous hydrogen sulfide. An excess of hydrogen chloride may be employed without formation of undesirable by-products.

Hydrogen sulfide remaining in the gaseous state, is separated from the liquid antimony trichloride as a consequence. The antimony trichloride is then purified by fractional distillation as set forth above.

To conserve sulfur, hydrogen sulfide may be reacted by conventional means to form elemental sulfur or with an alkali base to form the corresponding alkali sulfide which is made available as an item of commerce.

When chlorine is employed, the principle products are antimony trichloride and elemental sulfur. To avoid the formation of chlorinated sulfur compounds, chlorine should be employed in approximately stoichiometric amount.

The liquid phase containing reaction products is then separated from the gangue by filtration at a temperature above the solidification temperature of the antimony trichloride or the entire liquid phase may be vaporized from the gangue, condensed and subsequently purified by fractional distillation, with one fraction being antimony trichloride of high purity.

By employing liquid-gas phase reaction conditions, as opposed to solid-gas reaction conditions, lower cost materials of construction can be employed as corrosive conditions are avoided. Furthermore, heat exchange surfaces can be reduced as liquids enjoy better contact area with heat exchange surfaces. As a whole, therefore, overall plant equipment is simplified.

Another important factor when hydrogen chloride is employed as the reactant is that there is greater utilization of hydrogen chloride. If a solid-gas phase reaction were employed at high temperatures, there would only be about 40% utilization of hydrogen chloride when both the hydrogen chloride and formed antimony trichloride are in the gas phase. In contrast, where antimony trichloride is maintained in the liquid phase, percent conversion or utilization of hydrogen chloride increases to about 65%.

Another but less desirable route to forming antimony trichloride from antimony sulfide bearing ores is to conduct the reaction in a liquid phase in the presence of a chlorinated sulfur compound which is reactive with respect to antimony sulfide.

Another route is direct reaction of stibnite or other antimony-bearing ores with chlorine gas at a temperature from about 350°C to about 700°C, preferably from about 450°C to about 550°C. In this system there is formed as the principal products, sulfur and antimony trichloride with minor amounts of chlorinated sulfur compounds as low boiling by-products. Again, fractional distillation yields an initial cut which contains low boiling constituents including chlorinated sulfur compounds as well as any arsenic compounds present. As a second cut, there is formed high purity antimony trichloride with elemental sulfur remaining as the residue.

As opposed to gas-liquid phase reaction, this route requires greater heat exchange surfaces to remove the exothermic heat of reaction. It is, therefore, considered of secondary importance to low temperature chlorination.

Still another, but less desired route is the reaction of stibnite with anhydrous hydrogen chloride at high temperatures. Under the condition employed, the principle products are antimony trichloride and hydrogen sulfide. Hydrogen sulfide remains in the gaseous state and antimony trichloride is separated by condensation for subsequent purification by fractional distillation.

Independent of the route practiced to form antimony trichloride an antimony trichloride of a purity in excess of 99 percent is readily formed.

Equally important is the complete conservation of the sulfur which eliminates pollution problems attendant to conventional methods of treating antimony sulfide bearing ores.

The antimony trichloride formed as a consequence of the process of this invention may be sold as such, converted to antimony metal or other antimony compounds such as, typically, the oxides of antimony.

Because of the high purity of the antimony trichloride formed, it is an ideal intermediate for direct conversion to high purity antimony oxide by hydrolysis in a basic solution, preferably an ammonia based solution. The antimony oxide formed has a purity in excess of 99% without employing any extraordinary purification measures.

DESCRIPTION

The present invention relates to the conversion of antimony sulfide-bearing ores to antimony trichloride with attendant conservation of sulfur and elimination of pollutants normally formed when such ores are processed for recovery of antimony values. The process of this invention is also particularly useful for the production of high purity antimony trichloride from ores of high arsenic content in that the practice of the process permits substantially complete separation of any arsenic compounds present in the ore to form high purity antimony trichloride. The antimony trichloride produced is of sufficient purity for direct conversion to antimony oxide by hydrolysis to yield high purity antimony oxide.

The process for the production of antimony trichloride in accordance with the practice of the present invention comprises, in general, reacting antimony sulfide-bearing ores, such as stibnite, tetrahedrite, jamesonite and the like, with a source of chlorine at a temperature above the melting point of antimony trichloride and sufficient to convert antimony sulfide to antimony trichloride and sulfur or hydrogen sulfide.

The resultant reaction mass is then fractionally distilled, the initial cut being materials boiling normally below about 200°C and which contain arsenic compounds and other low boiling compounds present in the reaction mass. The second cut taken off by fractional distillation is the high purity antimony trichloride which condenses as a clear water-white liquid and solidifies as a white solid at a temperature of about 72°–73°C, which is in itself a direct indication of the high purity of the antimony trichloride formed in view of the the recognized melting point of antimony trichloride as being 73.4°C, as published by the "Handbook of Chemistry and Physics", 36th edition (1954–1955).

Antimony trichloride collected in accordance with the process of this invention may be marketed as such, or converted to antimony metal or other antimony derivatives. As one aspect of this invention, the antimony trichloride is converted to antimony oxide by hydrolysis, preferably employing an ammonia based aqueous solution which yields a finely divided particulate precipitate of antimony oxide having a purity in excess of 99%.

There are several basic routes for preparing antimony trichloride from antimony sulfide-bearing ores without generation of $SO_2$ as a pollutant.

The preferred route involves a liquid phase low temperature reaction in an antimony trichloride melt. This involves reaction with hydrogen chloride, preferably anhydrous hydrogen chloride, and/or chlorine to produce antimony trichloride from antimony sulfide dissolved in the melt along with gaseous hydrogen sulfide and/or dissolved sulfur.

In this embodiment, antimony sulfide is dissolved in whole or at least in part from the ore or ore concentrate in which it is contained in an antimony trichloride melt. Reaction with hydrogen chloride and/or chlorine then takes place at a temperature from the melting point of antimony trichloride, about 72°C to the boiling point of antimony trichloride at the pressures employed. The temperature will, in general, range from about 72° to about 220°C, preferably from about 72°C to 120°C. Low temperatures are preferred since oxygen can be tolerated without fear of sulfur dioxide formation. At higher temperatures, however, reaction should be carried out in the substantial absence of oxygen.

In addition, where hydrogen chloride is the reactant, hydrogen chloride utilization is favored at lower temperatures. That is, for a given pressure, the total volume of hydrogen chloride required for reaction decreases with temperature.

As between hydrogen chloride and chlorine, hydrogen chloride is the preferred reactant as hydrogen chloride reacts with antimony sulfide by the reaction:

$$Sb_2S_3 + 6HCl \rightarrow 2SbCl_3 + 3H_2S \qquad (2)$$

yielding gaseous hydrogen sulfide which evolves from the reaction system.

Hydrogen sulfide is a readily handleable gas and easily converted to products of commerce. It may, for instance, be converted to elemental sulfur by known means or reacted with an alkali base to form the corresponding alakli sulfide.

Hydrogen chloride is also preferred because it has been found there is no criticality as to the amount present. Excessive amounts can be employed without having an adverse effect upon the reaction system. Although not required for low temperature reactions, it is preferred to employ a substantial excess of anhydrous hydrogen chloride.

Chlorine is equally effective as a reactant, and reacts with antimony trichloride by the reaction:

$$Sb_2S_3 + 3Cl_2 \rightarrow 2SbCl_3 + 3S° \qquad (3)$$

If chlorine is not completely consumed in the reaction system it will react with the formed sulfur to form in turn chloro-sulfur compounds such as sulfur monochloride. As these present some separation problems during the ultimate recovery of antimony trichloride as a product, it is most desirable to limit the amount of chlorine employed to about a stoichiometric amount. This aids in preventing the formation of chloro-sulfur compounds which are unstable and, as indicated, present separation problems.

The advantages of employing a gas-liquid reaction route are several.

Where hydrogen chloride is employed, better utilization of hydrogen chloride is realized as opposed to a high temperature system where the reaction is carried out in a solids gas phase. Under these conditions, only about 40% utilization of hydrogen chloride is realized. In a low temperature gas-liquid phase operation, on the other hand, as much as 65% or more conversion of hydrogen chloride is realized.

When chlorine is used as the reactant, the liquid system has better heat transfer characteristics, and the exothermic heat of reaction can be more readily transferred out of the reaction system. Since heat transfer is more efficient, equipment sizing is reduced.

In both cases, less corrosive conditions are present, permitting simpler materials of construction to be employed. In addition, there is more efficient contact between reactants resulting in improved rates of reaction. As a consequence, simple vessels such as stirred reactors can be used.

In all, overall plant size and costs are materially reduced.

Following completion of the reactions involved, distillation is employed to separate reaction products and recovery of antimony trichloride.

While distillation from the reaction vessel itself may be employed, vaporization of all the volatiles from the gangue followed by fractional distillation is preferred.

When carried out at, or close to, atmospheric pressures there is generally formed by fractional distillation a first cut which are the low boiling constituents, boiling below about 200°C. This fraction would include arsenic compounds formed or extracted from the gangue, in addition to any other low boiling impurity extracted from or formed by reaction with the gangue.

The second friction is predominantly antimony trichloride and distillation is controlled such that the fraction which is carried over as the product contains materials having a boiling point between 200°C and about 240°C, preferably from about 215°C to about 225°C, and more preferably at about 220°C, the more preferred temperature yielding antimony trichloride of 99 percent + purity.

When hydrogen chloride is the reactant, sulfur is not formed. As a consequence, the highest boiling fraction will only contain various impurities from the gangue such as iron, aluminum, lead, calcium, and various sulfur compounds.

When chlorine is the reactant, sulfur will also be present. Sulfur, however, is conserved, and may be further purified by conventional means to remove the impurities present.

For instance, direct chlorination involving a liquid-vapor phase reaction results in the formation of a slurry of the gangue in a melt of a mixture of antimony trichloride and sulfur. Chlorine may be introduced into the system while maintaining the contents at a temperature of from about 100°C to about 150°C with cooling to remove the heat of reaction. The temperature of the system is then increased to an elevated temperature normally from the boiling point of sulfur in the system to about 500°C, preferably, from about 470°C to about 490°C under an inert atmosphere such as a nitrogen atmosphere for a period of time to vaporize the sulfur and antimony trichloride which is condensed or partially condensed for fractional distillation.

The effluent collected is maintained at a temperature above the melting point of antimony trichloride forming a liquid phase, and may be fractionally distilled to yield high purity antimony trichloride.

Another route involves the use of sulfur monochloride ($S_2Cl_2$) as the reactant which, when brought in contact with antimony sulfide, will yield antimony trichloride and sulfur by the reaction:

$$Sb_2S_3 + 3 S_2Cl_2 \rightarrow 2SbCl_3 + 9S \qquad (4)$$

The use of sulfur monochloride for the liquid phase reaction has some merits.

First, there is introduced to the system a reactant which will yield products which are desirably formed without yielding by-products to be dealt with as impurities in the recovery of the antimony trichloride.

In addition, the sulfur monochloride serves as a solvent for both the antimony trichloride and the sulfur formed in the reaction, so long as the reaction solution is maintained above the solidification temperature of antimony trichloride in the system, namely above about 72°C.

Reaction may be carried out at any temperature above the melting point of antimony trichloride in the system.

Since the antimony sulfide is normally supplied for reaction as part of an ore or ore concentrate, there is formed as a consequence of the liquid phase reaction, a slurry of antimony trichloride, sulfur, and sulfur monochloride, and a gangue residue.

The antimony trichloride, sulfur, and sulfur monochloride may then be separated from the residual gangue by filtration or by vaporization of the volatiles from the gangue, condensing all or part of the vapors, then forming a purified antimony trichloride by fractional distillation as more particularly set forth below.

There are, however, several disadvantages to using sulfur monochloride. First of all, it is a more expensive reactant, as compared to the chlorine from which it is made. In addition, it adds more sulfur to the system, and increases problems of product separation. Finally, it is somewhat unstable, decomposing first to sulfur dichloride and sulfur, the sulfur dichloride then decomposing to chlorine and sulfur.

Thus, while useful, it is presently less desirable than to direct low temperature hydrochlorination or chlorination routes.

When this route is employed, purification may be carried in the same manner as routes employing direct chlorination.

Where antimony trichloride is formed by reaction with sulfur monochloride, however, the sulfur monochloride is also carried overhead as part of the first fraction and is normally reprocessed by additional fractional distillation to recover it to purify the sulfur monochloride for recycle to the reaction system.

Another route to the formation of antimony trichloride with conservation of sulfur, involves high temperature chlorination of antimony sulfide-bearing ore. Chlorination in accordance with this method of preparing antimony trichloride involves direct contact of chlorine gas or a gass which will release chlorine for reaction with antimony sulfide at the temperature employed.

Chlorination may be generally carried out at a temperature of from about 350°C to about 700°C, preferably from about 450°–550°C.

Preferably, the antimony sulfide-bearing ore is preheated to reaction temperature under an oxygen-free atmosphere such as a nitrogen atmosphere, and for maximum contact the inert gas is generally percolated through the antimony sulfide-bearing ore at flow rates below which elutriation or fluidization of the ore will occur.

Once the system reaches the desired reaction temperature, the flow of the inert gas is supplanted by a flow of chlorine or a gaseous chlorine donor such as vaporized sulfur monochloride, which will release chlorine for reaction with antimony sulfide at the temperatures involved.

High temperature chlorination as carried out in accordance with this aspect of the invention generally yields antimony trichloride by the reaction (3) above.

Where the reaction is carried out at temperatures above the boiling point of sulfur under the conditions employed, the sulfur along with antimony trichloride in the vapor state will pass overhead for collection by condensation.

Where chlorination is carried out at temperatures below the boiling point of sulfur, a portion of the sulfur will be in the vapor phase, another portion may be carried over as an aerosol, with the balance remaining per se or condensed within the reaction vessel as elemental sulfur with the residual gangue for separation therefrom by means of a solvent for sulfur such as toluene.

Preferably, however, the reaction is carried out under conditions where the sulfur as well as the antimony trichloride are carried overhead in the vapor state, condensed, and then fractionally distilled in the manner described above.

The lighter cut, however, will normally contain the residual sulfur monochloride when it is used as the source of chlorine or formed by the reaction of sulfur with chlorine during chlorination of the antimony sulfide or antimony sulfide bearing ore.

There will additionally be present in the lighter fraction other low boiling impurities extracted or formed by the reaction with the gangue and including any arsenic compounds present.

The middle cut is, as indicated, essentially pure antimony trichloride with the purity being determined primarily by the fineness of the cut taken.

Where sulfur has been taken over with the antimony trichloride in the vapor state, it will remain behind as a heavy end of the fractional distillation operation and may, because of temperatures employed, be essentially free of impurities.

It may, however, as would be expected by one skilled in the art, contain some residual antimony trichloride.

This route is not desired, as much larger heat transfer surfaces or other means are required to carry off the exothermic heat of reaction.

Another less desirable route for the formation of antimony trichloride in accordance with the practice of this invention, involves the reaction of antimony sulfide bearing ores with anhydrous hydrogen chloride at temperatures above the vaporization temperature of antimony trichloride under the reaction conditions employed.

In general, reaction with anhydrous hydrogen chloride is carried out from about 200°C up to the melting point of antimony sulfide and preferably from about 250°C to about 350°C.

Reaction of antimony sulfide with anhydrous hydrogen chloride in accordance with the practice of this invention occurs by the general reaction (2) above.

At the temperatures employed, the hydrogen sulfide, the antimony chloride, arsenic compounds, and other low boilers, are in the vapor state and pass overhead from the reaction vessel.

The antimony trichloride and any arsenic or other low boilers present may then be separated from the hydrogen sulfide by mere condensation at a temperature below the condensation temperature of the lowest boiler, at which temperature hydrogen sulfide remains in the vapor state.

As the hydrogen sulfide may tend to retain with its antimony trichloride as an aerosol, condensation is preferably carried out by passing the gaseous stream through a packed column maintained at a temperature just slightly above the melting point of antimony trichloride to maximize antimony trichloride collection from the gaseous stream.

There will, as indicated, be generally collected with antimony chloride, arsenic values and other impurities extracted from the gangue ore.

These, however, as previously indicated, can be separated from the antimony trichloride by fractional distillation at temperatures below about 200°C at which all the low boiling impurities will evolve, leaving a residue of liquid antimony trichloride.

If it is determined that the antimony trichloride also contains high boiling impurities, there may be taken a second cut in the manner previously described to upgrade the purity of the antimony trichloride formed.

The conditions set forth above for the conversion of stibnite or antimony sulfide to antimony trichloride have been set forth for an operation carried out at, or close to, atmospheric pressure. It will be understood, however, by one skilled in the art that temperatures involved in both the chlorination of antimony sulfide as well as fractional distillation of the product may be varied by varying the pressure at which either the chlorination reaction or the fractional distillation is carried out. In general, the temperatures will increase with an increase in pressure and decrease for operations at pressures carried out below atmospheric pressure.

The process, as indicated, is amenable to direct reaction of antimony sulfide. Normally, however, the antimony sulfide will be provided as part of an ore concentrate. While the ore can be tested directly as mined, in order to minimize operating costs and the volume of material being processed and the amount of gangue remaining in the reaction system for removal, it is preferred to at least initially upgrade the antimony sulfide content of the ore by known techniques including sorting, flotation or other beneficiation techniques.

The antimony trichloride formed as a consequence of the practice of this invention may be converted to antimony metal which may be used in the preparation of alloys, antimony oxide which is used as a pigment and fire retardant, antimony pentachloride which is used as a chlorination agent or sold as such as an intermediate for preparing other antimony compounds.

Because of the high purity of the antimony trichloride produced in accordance with the practice of this invention, it is most desirous to convert antimony trichloride to high purity antimony oxide for use as a pigment, or the like.

This may be carried out by hydrolysis of the antimony trichloride with a basic aqueous solution containing ammonium hydroxide, an alkali hydroxide, an alkali carbonate, or the like which will react with the antimony trichloride to form antimony oxide as a solid precipitant.

The reaction may be carried out at any temperature between the freezing point and boiling point of the aqueous solution.

For simplicity, the hydrolysis will be described in terms of the use of an aqueous ammonia solution. Where antimony oxide is formed by reaction in an aqueous ammonia solution, the principal reaction involved is:

$$2 \text{ Sb Cl}_3 + 6 \text{ NH}_3 + 3 \text{ H}_2\text{O} \rightarrow \text{Sb}_2\text{O}_3 + 6 \text{ NH}_4\text{Cl} \quad (5)$$

The ammonia for the hydrolysis is usually provided in excess of that required for reaction with the antimony trichloride.

Employing the antimony trichloride formed in accordance with the practice of this invention, there is generally formed antimony oxide in the form of a fine white powder of a purity in excess of 99 percent and having a particle size which makes it particularly useful as a pigmenting agent.

To obtain the product following reaction is the basic solution, the antimony oxide which forms as a precipitate is normally filtered from the solution, washed and dried.

In the formation of antimony chloride in accordance with the practice of the invention, the preferred routes lead to the formation of elemental sulfur. Where there may be formed, however, hydrogen sulfide as a product of the reaction, the hydrogen sulfide may be readily converted to sulfur by the overall reaction:

$$2 \text{ H}_2\text{S} + \text{O}_2 \rightarrow 2 \text{ H}_2\text{O} + 2\text{S} \quad (6)$$

with a source of oxygen normally being air. The techniques employed for the reaction are well known in the art.

Alternatively, the hydrogen sulfide may be reacted with chlorine to form hydrogen chloride by reaction:

$$\text{H}_2\text{S} + \text{Cl}_2 \rightarrow 2\text{HCl} + \text{S} \quad (7)$$

The hydrogen chloride formed may be recycled to the chlorination reactor and sulfur recovered as a product.

In the alternative, the hydrogen sulfide may, after separation from unreacted hydrogen chloride, be bubbled through or absorbed by a caustic solution containing sodium ions to form a sodium sulfide solution which can be sold as such.

While nowise limiting, the following are examples of the formation of antimony trichloride in accordance with the practice of this invention, as well as hydrolysis to antimony oxide.

EXAMPLE 1

Flotation concentrate of a stibnite ore containing 64% by weight antimony as antimony sulfide was introduced into a reactor having a porous base which served to support the ore concentrate and as a gas distribution plate for gases entering the base of the reactor. The top of the reactor was fitted with a filter to retain fine particles elutriated by the flow of gas through the reactor. The output of the reactor was connected to a condensation collection vessel.

There was introduced to the reactor, a flow of nitrogen at a rate sufficient to cause fluidization of the particulate flotation concentration and the reactor contents were heated to a temperature of 500°C.

When the reactor contents reached a temperature of 500°C, the flow of nitrogen was supplanted by a flow of chlorine gas. Again, the rate of flow of chlorine gas through stibnite ore concentrate was insufficient to cause fluidization of the ore concentrate. Upon contacting the stibnite, an exothermic reaction occurred between chlorine gas and the antimony sulfide, resulting in the formation of antimony trichloride and sulfur which passed overhead in the gaseous state and condensed in the collection vessel.

The condensate was then distilled using a reflux condenser. The first distillate which came over was a dark brown liquid which boiled in the range between 55° and 124°C. Analysis of the distillate disclosed that it consisted of sulfur dichloride and sulfur monochloride apparently formed toward the end of the chlorination cycle by reaction of chlorine with free sulfur.

The next fraction which distilled over consisted primarily of antimony trichloride and distilled at a temperature of 210°–215°C. The amount collected represented a yield of 85% of the antimony in the initial stibnite ore flotation concentrate. Sulfur remained in the distillation vessel as the final product and was collected from the base of the vessel.

To 80 parts by weight of the collected antimony trichloride there was added 200 parts by weight water containing 22 parts by weight ammonia. In an exothermic reaction there was formed antimony trioxide and ammonium chloride. The antimony trioxide was filtered from the aqueous solution, washed and dried. A total of 50.9 parts by weight antimony trioxide was collected which represented a 99 percent yield based on the weight of the antimony trichloride hydrolyzed.

The antimony trioxide was very fine, pure white, and had a particle size ranging from 1–8 microns. Analysis of the material showed that it consisted of 99.8 ±.05% $Sb_2O_3$ and the balance containing very low levels of arsenic, iron, silver, and lead.

The above process is also employed with other antimony sulfide bearing ores and concentrates with similar results.

EXAMPLE 2

The chlorination procedure followed in Example 1 was repeated except that the flow of nitrogen gas through the stibnite concentrate was interrupted at a temperature of 250°C and replaced by a flow of hydrogen chloride gas which yielded on reaction with stibnite, antimony trichloride, hydrogen sulfide and unreacted hydrogen chloride.

This is because the reaction is reversible and an equilibrium is reached which prevents complete reaction with hydrogen chloride. At the temperature employed about 60 percent of the hydrogen chloride passed through unreacted. The first gaseous effluent from the reactor was red to orange in color and appeared to contain the reaction products formed by reaction of hydrogen chloride with impurities present in the stibnite flotation concentrate. The second material which passed overhead was a gas from which there was condensed first a clear, colorless liquid which solidified at 70°C. The material was identified as antimony trichloride.

Throughout the reaction, hydrogen sulfide gas and hydrogen chloride evolved from the reactor. Because of the high volume of gases evolved, the gases carried with them some of the antimony trichloride which passed through the receiver as an aerosol. This lowered the collection efficiency. Of the theoretical amount of antimony trichloride available as a product from the concentric processed, there was collected 69.6%.

The collected product was then distilled. A small forecut came over at a distillation column temperature between 50° and 205°C. The forecut was a reddish liquid which was discarded. Following the forecut, there was collected a center cut which distilled over at a distillation temperature in the range from 209°C to 212°C. The material condensed as a water-white liquid and solidified at 72°C to 73°C as a white solid.

28.8 parts by weight of the white solid center cut was hydrolyzed in an aqueous ammonia solution containing 40 percent excess ammonia over that stoichiometrically required for the reaction:

$2SbCl_3 + 6 NH_3 + 3 H_2O \rightarrow Sb_2O_3 + 6 NH_4Cl$ (5)

The antimony trioxide product formed by the hydrolysis was filtered, washed and dried, and consisted of 18.2 parts by weight of a fine white powder which represents a yield of 99.5 percent of $Sb_2O_3$ based on the amount of $SbCl_3$ hydrolyzed. The product was found to be 99+% pure $Sb_2O_3$.

The above procedure can be used on jamesonite and tetrahedrite with similar results.

EXAMPLE 3

112 parts by weight of the stibnite flotation concentrate used in Example 1 was placed in a reaction vessel having a reflux condenser. To the reaction vessel there was added dropwise 202 parts by weight sulfur monochloride ($S_2Cl_2$). There was initiated immediately an exothermic reaction which yielded antimony trichloride and sulfur as principal products. The amount of sulfur monochloride introduced to the reactor was 71 percent excess of the amount required for the reaction:

$Sb_2S_3 + 6S_2Cl_2 \rightarrow 2SbCl_3 + 9S$ (4)

This excess amount of sulfur monochloride was sufficient to dissolve the sulfur produced in the reaction. The reaction mixture was filtered at a temperature above 72°C in order to maintain antimony chloride in the liquid state as a miscible member of the $S_2Cl_2$—S solution.

After filtration, the gangue which remained on the filter was discarded.

The filtrate was then distilled. The first fraction collected was 100 parts by weight sulfur monochloride. This was followed by a fraction containing 130 parts by weight antimony trichloride. The condensed antimony trichloride was a clear, white liquid solidifying to a white solid. The yield was 98 percent based on the antimony contained in the ore concentrate. A residue of 98.2 parts by weight sulfur remained in the distillation vessel and was collected as such.

Of the antimony trichloride collected, 24.3 parts by weight was hydrolyzed by reaction in a solution containing 6.5 parts by weight ammonia and 150 parts by weight water. There was formed 15.5 parts by weight antimony trioxide precipitate which was white in color and represented 99.8 percent of the yield based on the antimony trichloride fed to the hydrolysis reactor.

EXAMPLE 4

To 174.97 parts by weight of a stibnite flotation concentrate containing 61.5 percent antimony as antimony sulfide was mixed 193.35 parts by weight of a previously prepared mixture of antimony trichloride and sulfur in a reaction vessel. The mixture was heated to 130°C to melt the antimony trichloride sulfur mixture and there was formed a slurry with the stibnite. A total of 99.9 parts by weight chlorine was introduced beneath the level of the slurry, which was continuously agitated over a period of about 4.75 hours. The temperature of the slurry was maintained at within 10° of 140°C by controlling the rate of addition of chlorine and cooling of the reaction vessel. The amount of chlorine added was 6 percent greater than the amount required to react with the stibnite to form antimony trichloride by the reaction:

$Sb_2S_3 + 3Cl_2 \rightarrow 2 SbCl + 3S$ (3)

After chlorine addition, the resultant reaction mass totaling 459.68 parts by weight and transferred to a high temperature vessel. The vessel and contents were gradually heated to 480°C under a nitrogen atmosphere. A total of 430.39 parts by weight of a mixture of antimony trichloride and sulfur was volatilized from the reaction mass and recovered by condensation. 19.59 parts by weight of a non-volatile residue remained. An analysis of the residue indicated that it contained approximately 1.5 percent antimony which established that over 99 percent of the antimony sulfide had reacted with the chlorine.

Of the product collected, 166.31 parts by weight was distilled. An overhead product of 133.42 parts by weight of antimony trichloride was recovered. A residue of 32.34 parts by weight remained in the reboiler and consisted primarily of sulfur with a minor amount of antimony trichloride.

EXAMPLE 5

A flotation concentrate of a stibnite ore containing 64 percent by weight antimony as antimony sulfide is introduced into the reactor of Example 1, which is now fitted with a pressure control system on the outlet. The pressure control system allows the pressure within the reactor to be maintained at pressures above atmospheric.

There is introduced into the reactor through the bottom porous plate support, as in Example 1, a flow of nitrogen gas at a rate insufficient to cause fluidization of the particulate flotation concentrate. The reactor contents are then heated to a temperature of 520°C and the pressure within the reactor is adjusted to 2 atmospheres by the pressure control system.

When the reactor contents reach a temperature of 520°C, the flow of nitrogen is supplanted by a flow of chlorine gas as in Example 1. Upon contacting the stibnite, an exothermic reaction takes place between the chlorine gas and the antimony sulfide, resulting in the formation of antimony trichloride and sulfur and low boiling impurities which pass overhead in the gaseous state, through the pressure controlled reactor outlet and into a cooled collection vessel where the effluent is condensed.

The condensate is distilled in a fractional distillation apparatus using a reflux condenser. The distillation apparatus is also equipped with a pressure control system similar to that employed in the reactor. By means of the pressure control system the pressure within the fractional distillation apparatus is maintained at 2 atmospheres. The first distillate, which boils in the range between 70°C and 142°C at 2 atmospheres pressure is a dark brown liquid consisting of sulfur dichloride and sulfur monochloride, apparently formed toward the end of the chlorination cycle by reaction of chlorine with free sulfur.

The next fraction which distills over consists primarily of antimony trichloride and distills at a head temperature of 248°C to 252°C. The distillation is discontinued when the temperature within the reboiler of the distillation apparatus reaches 495°C, indicating that the material remaining in the reboiler is sulfur.

The amount of material in the second distillation fraction represents a yield of 83 percent of the antimony in the initial stibnite ore flotation concentrate.

A portion of the second distillation concentrate is reacted with aqueous ammonia as in Example 1 to form high purity antimony trioxide at a yield of 99.8 percent.

EXAMPLE 6

The work described in this Example was designed to recover as completely as possible the antimony in the ore. Two reactors identical to the reactor of Example 1 were connected in series so that the gases issuing from the first reactor (reactor 1) passed through the second reactor (reactor 2) before passing into the cooled collection vessel.

One hundred parts by weight of a flotation concentrate of a stibnite ore containing 64 parts by weight antimony as antimony sulfide was introduced into each reactor. The reactors were then heated to 500°C while a flow of nitrogen gas at a rate insufficient to cause fluidization of the particulate flotation concentrate was passed through the two reactors in series.

When the reactor contents reached a temperature of 500°C, the nitrogen flow was replaced by a flow of chlorine gas as in Example 1. An increase in the temperature of Reactor 1 indicated that the reaction was taking place between the chlorine gas and the stibnite flotation concentrate. The antimony trichloride and sulfur vapors formed by the reaction passed through Reactor 2, and thence into a cooled collection vessel where they condensed.

After passage of 80.4 parts by weight of chlorine gas through the reactors, the chlorine flow was replaced by a nitrogen flow and the reactors were allowed to cool. The weight loss from both reactors was determined. Reactor 1 was found to have lost 88.65 parts by weight and Reactor 2 had lost 46.31 parts by weight. The product was distilled and the weights of antimony trichloride and sulfur obtained were determined. These values are listed in Table 1 as Cycle 1.

The unreacted gangue in Reactor 1 was then removed and the reactor was re-charged with 100 parts by weight of the same stibnite flotation concentrate used in Cycle 1. The apparatus was then re-assembled using the previous Reactor 2 as Reactor 1 and Reactor 1 re-charged to become Reactor 2. The assembly was again heated to 500°C with nitrogen flowing through both reactors and the nitrogen was replaced with chlorine as before when the reactor temperatures reached 500°C.

After passage of 54 parts by weight of chlorine the reactors were again cooled under a flow of nitrogen and the weight loss from both reactors determined. It was found that Reactor 1 had lost a total of 90.17 parts by weight during the two chlorination cycles and that Reactor 2 had lost 36.79 parts by weight during the second cycle. Thus, by alternating the positions of the two reactors in this manner, essentially all of the antimony sulfide could be recovered from the flotation concentrate as antimony chloride and sulfur without using an excess of chlorine gas nor forming undesirable by-products such as sulfur chlorides. The results of this run are shown in Table 1 as Cycle 2.

Again the unreacted gangue was removed from Reactor 1 and it was re-charged with 100 parts by weight of fresh flotation concentrate. The apparatus was again assembled, reversing the positions of the two reactors so that the previous Reactor 2 became Reactor 1 and the freshly charged Reactor 1 became Reactor 2. The procedure was repeated for a total of 7 cycles, as shown in Table 1.

Overall, for the seven cycles, 93.45 percent of the antimony was recovered as antimony trichloride, based on the overall weight loss from the reactors. The chlorine utilization was 92.53% based on the total chlorine added during the seven cycles and the total chlorine accounted for as total product of the seven cycles.

Table 1

| Cycle | Parts By Wt. Cl Added | Wt. Loss (Total) Parts By Weight Reactor 1 | Reactor 2 | Parts By Wt. Recovered SbCl$_3$ | S | % Sb Recov. | % Cl$_2$ Recov. |
|---|---|---|---|---|---|---|---|
| 1 | 80.4 | 88.65 | 46.31 | 167.48 | 37.83 | 92.4 | 97.1 |
| 2 | 54 | 90.17 | 36.79 | 99.64 | 23.05 | 92 | 90.12 |
| 3 | 57.6 | 88.27 | 31.05 | 103.27 | 21.80 | 93 | 89.34 |
| 4 | 69.0 | 92.04 | 42.22 | 133.71 | 28.20 | 96.2 | 100.5 |
| 5 | 56.1 | 91.5 | 55.26 | 133.82 | 28.24 | 95.2 | 111.0 |

Table 1-continued

| Cycle | Parts By Wt. Cl Added | Wt. Loss (Total) Parts By Weight | | Parts By Wt. Recovered | | % Sb Recov. | % Cl₂ Recov. |
|---|---|---|---|---|---|---|---|
| | | Reactor 1 | Reactor 2 | SbCl₃ | S | | |
| 6 | 35.2 | 85.95 | 15.53 | 52.99 | 11.2 | 85.4 | 70.0 |
| 7 | 76.5 | 91.52 | 50.34 | 160.56 | 33.88 | 94.64 | 97.8 |
| Overall | | | | | | 93.45 | 92.53 |

EXAMPLE 7

A flotation concentrate of a tetrahedrite ore containing 17.4 percent antimony as antimony sulfide was introduced into a reactor having a bottom gas inlet and a top gas outlet. The reactor was heated to a temperature of 500°C with a flow of nitrogen at a rate insufficient to cause fluidization of the ore concentrate.

When the reactor contents reached a temperature of 500°C, the flow of nitrogen was supplanted by a flow of chlorine gas. Again, the rate of flow of the chlorine gas through the tetrahedrite ore concentrate was insufficient to cause fluidization of the ore concentrate. Upon contacting the tetrahedrite, a reaction took place between the chlorine gas and the antimony sulfide, resulting in the formation of antimony trichloride and sulfur, which passed overhead in the gaseous state and was condensed in a collection vessel. The chlorine flow was stopped after a dark brown material resembling ferric chloride appeared in the reaction products. This was formed from iron sulfide present in the ore concentrate.

The condensate from the reaction was distilled using a reflux condenser. The first distillate which came over was a dark brown liquid consisting of sulfur monochloride and sulfur dichloride. The sulfur dichloride is a breakdown product of sulfur monochloride. The next fraction which distilled over consisted primarily of antimony trichloride. The antimony trichloride collected as overhead product plus that in the reflux column plus that remaining in the reboiler of the distillation apparatus represented a yield of over 95 percent of the antimony contained in the initial tetrahedrite ore flotation concentrate.

EXAMPLE 8

An apparatus consisting of two reactors as described in Example 6 was used in the work described in this Example. The reactors contained jamesonite ore which contained 21.3 weight percent antimony as the sulfide. The reactors were heated to a temperature of 228°C under a flow of nitrogen as in Example 2. At this temperature the flow of nitrogen was interrupted and replaced by a flow of hydrogen chloride gas. The gaseous products issuing from the reactor were passed through a flash condenser in which the antimony trichloride produced in the reaction was condensed and collected.

After passage of hydrogen chloride gas, the reactors were allowed to cool with a flow of nitrogen passing through them. Analysis of the reactor contents showed the bottom reactor contents to contain 0.26 weight percent of antimony, while the contents of the top reactor, which had reached a higher temperature during the experiment, consisted of only 0.12 weight percent of antimony. Over 99 weight percent of the antimony was thereby extracted from the ore.

EXAMPLE 9

2000 parts by weight of a stibnite flotation concentrate containing 53.1 percent antimony as antimony sulfide was added to 2280 parts by weight of a liquid heel retained from a previous run. The heel consisted of 1765 parts by weight of antimony trichloride and 515 parts by weight of gangue. The slurry of flotation concentrate and gangue in antimony trichloride was maintained at 82°C and agitated to keep the solids in suspension. 1270 parts by weight of anhydrous hydrogen chloride gas was introduced below the surface of the liquid. Analysis of the off-gas from the reaction for hydrogen chloride and hydrogen sulfide revealed that 65 percent of the hydrogen chloride reacted with the antimony sulfide according to reaction (2).

An additional 4000 parts by weight of the same flotation concentrate was then added to the slurry and anhydrous hydrogen chloride was introduced into the slurry until analysis of the off-gases revealed that no further reaction was taking place.

A portion of the slurry in the reactor was then removed, leaving 2040 parts by weight remaining in the reactor to serve as a heel for the next run. The volatile fraction of the slurry was separated from the gangue by evaporation, condensed and then distilled through a reflux column. A small forecut containing arsenic chloride and water formed by reaction of hydrogen chloride with oxide contaminants in the ore was discarded. A second fraction, which boiled at 222.8°C was collected and found to consist of 5780 parts by weight of high purity antimony trichloride. This represent 96.8% recovery of the antimony values in the flotation concentrate, exclusive of holdup in the column and reboiler.

Analysis of the gangue revealed that it contained less than 2% of the antimony present in the original flotation concentrate.

What is claimed is:

1. A gas-liquid phase process for the production of antimony trichloride from antimony sulfide bearing ores and concentrates in particle form which comprises:
    a. reacting antimony sulfide contained in a melt of antimony trichloride in at least one reaction zone with gaseous hydrogen chloride at a temperature above the melting point and below the boiling point of antimony trichloride to form molten antimony trichloride and hydrogen sulfide; and
    b. purifying the formed antimony trichloride by fractional distillation, wherein the antimony trichloride is distilled and collected from an antimony trichloride containing distillable mass resulting from the reaction of antimony sulfide with hydrogen chloride.

2. The process as claimed in claim 1 in which the antimony trichloride is distilled at a temperpature of from about 215°C to about 225°C.

3. The process as claimed in claim 2 in which the purified antimony trichloride is converted to antimony oxide by hydrolysis in the presence of an aqueous basic solution.

4. The process as claimed in claim 3 in which the aqueous basic solution is an ammonia based solution.

5. The process as claimed in claim 1 in which the purified antimony trichloride is converted to antimony oxide by hydrolysis in the presence of an aqueous basis solution.

6. The process as claimed in claim 5 in which the aqueous basis solution is an ammonia based solution.

7. The process as claimed in claim 1 in which the reaction is carried out at a temperature from about 72°C to about 220°C.

8. The process as claimed in claim 7 in which the hydrogen chloride is anhydrous.

9. The process as claimed in claim 1 in which the antimony trichloride is distilled and collected at atmospheric pressure and at a temperature between about 200°C and 240°C.

10. The process as claimed in claim 1 in which the hydrogen chloride is anhydrous.

11. The process as claimed in claim 1 in which the reaction is carried out at a temperature from about 72°C to about 120°C.

12. The process as claimed in claim 1 in which the antimony trichloride is distilled and collected at a pressure of 2 atmospheres and at a temperature between about 248°C and 252°C.

13. The process as claimed in claim 1 in which chlorination of antimony sulfide is carried out at elevated pressures.

14. The process as claimed in claim 1 in which chlorination of antimony sulfide is carried out in a plurality of reaction zones connected in series.

* * * * *

UNITED STATES PATENT AND TRADEMARK OFFICE
CERTIFICATE OF CORRECTION

PATENT NO. : 3,944,653
DATED : March 16, 1976
INVENTOR(S) : Robert D. Stewart/John R. McKinley It is certified that error appears in the above-identified patent and that said Letters Patent are hereby corrected as shown below:

Column 2, line 47, "200°C" should read --220°C--.

Column 7, line 18, "to" should read --the--.

Column 7, line 35, "temperature" should read --temperatures--.

Column 9, line 61, "is" should read --in--.

Column 10, line 33, "sufficient" should read --insufficient--.

Column 12, line 48, "and" should read --was--.

Column 16, line 67, "temperpature" should read --temperature--.

Column 17, line 9, "basis" should read --basic--.

Column 17, line 12, "basis" should read --basic--.

Signed and Sealed this

Twenty-seventh Day of July 1976

[SEAL]

Attest:

RUTH C. MASON
Attesting Officer

C. MARSHALL DANN
Commissioner of Patents and Trademarks